United States Patent
Jimenez Buendia

(10) Patent No.: US 9,689,375 B2
(45) Date of Patent: Jun. 27, 2017

(54) WIND TURBINE INERTIA CONTROL SYSTEM

(71) Applicant: GAMESA INNOVATION & TECHNOLOGY, S. L., Sarriguren (Navarra) (ES)

(72) Inventor: Francisco Jimenez Buendia, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 74 days.

(21) Appl. No.: 14/634,053

(22) Filed: Feb. 27, 2015

(65) Prior Publication Data

US 2015/0260159 A1 Sep. 17, 2015

(30) Foreign Application Priority Data

Mar. 11, 2014 (ES) .................................... 201400192

(51) Int. Cl.
*F03D 9/00* (2016.01)
*H02P 9/04* (2006.01)
(Continued)

(52) U.S. Cl.
CPC ......... *F03D 7/0284* (2013.01); *F03D 7/0276* (2013.01); *F03D 9/257* (2017.02);
(Continued)

(58) Field of Classification Search
CPC .................................................... H02P 21/143
(Continued)

(56) References Cited

U.S. PATENT DOCUMENTS

| | | | | |
|---|---|---|---|---|
| 4,400,659 A | * | 8/1983 | Barron | F03D 7/0272 322/23 |
| 7,042,110 B2 | * | 5/2006 | Mikhail | F03D 7/0224 290/40 C |

(Continued)

FOREIGN PATENT DOCUMENTS

| WO | 2011/000531 A2 | 1/2011 |
|---|---|---|
| WO | 2011/124696 A2 | 10/2011 |

OTHER PUBLICATIONS

Duval, J., et al., "Frequency behavior of grid with high penetration rate of wind generation", 2009 IEEE Bucharest Power Tech Conference, Jun. 28-Jul. 2, Bucharest, Romania, pp. 1-6.
(Continued)

*Primary Examiner* — Pedro J Cuevas
(74) *Attorney, Agent, or Firm* — Ladas & Parry LLP

(57) ABSTRACT

Inertia control system for a wind turbine comprising a rotor (5), generator (12) driven by the rotor (5) that interacts with a power converter (13) to generate electricity, a wind turbine controller (15) that comprises a blade pitch controller (19) and a generated power controller (18), a controller for the power converter (14) that interacts with the wind turbine controller (15), characterized because it comprises an inertia emulation block (17) that generates an extra power signal (32) negatively proportional to the frequency change rate (23) that is added to the power reference of the wind turbine generated power controller (15) and adapts the rotational speed reference of the wind turbine controller (15) according to the grid frequency (21) to prevent distortion in the active power output after adding or subtracting power in proportion to the frequency change rate (23).

12 Claims, 8 Drawing Sheets

(51) Int. Cl.
  *F03D 7/02* (2006.01)
  *H02P 9/00* (2006.01)
  *H02P 21/14* (2016.01)
  *F03D 9/25* (2016.01)
  *H02J 3/38* (2006.01)

(52) U.S. Cl.
  CPC .............. *H02P 9/00* (2013.01); *H02P 21/143* (2013.01); *F05B 2270/107* (2013.01); *F05B 2270/1033* (2013.01); *F05B 2270/337* (2013.01); *H02J 3/386* (2013.01); *Y02E 10/723* (2013.01); *Y02E 10/763* (2013.01)

(58) Field of Classification Search
  USPC ...................................................... 290/44, 55
  See application file for complete search history.

(56) References Cited

U.S. PATENT DOCUMENTS

| | | | | |
|---|---|---|---|---|
| 7,231,282 | B2* | 6/2007 | Schubert | F03D 7/045 |
| | | | | 290/44 |
| 7,528,496 | B2* | 5/2009 | Fortmann | F03D 7/0264 |
| | | | | 290/44 |
| 8,095,244 | B2* | 1/2012 | Morjaria | F03D 7/0276 |
| | | | | 290/44 |
| 8,219,256 | B2* | 7/2012 | Nelson | F03D 7/0272 |
| | | | | 290/44 |
| 8,227,929 | B2* | 7/2012 | Burra | H02J 3/24 |
| | | | | 290/44 |
| 8,994,200 | B2* | 3/2015 | Thisted | F03D 7/0284 |
| | | | | 290/44 |
| 9,279,411 | B2* | 3/2016 | Beekmann | F03D 7/0224 |
| 9,300,142 | B2* | 3/2016 | Tarnowski | H02J 3/386 |
| 9,368,971 | B2* | 6/2016 | Ellena | H02J 3/38 |
| 2006/0113801 | A1* | 6/2006 | Schubert | F03D 7/045 |
| | | | | 290/44 |
| 2006/0273595 | A1* | 12/2006 | Avagliano | F03D 7/028 |
| | | | | 290/44 |
| 2007/0085343 | A1* | 4/2007 | Fortmann | F03D 7/0264 |
| | | | | 290/44 |
| 2007/0120369 | A1* | 5/2007 | Delmerico | F03D 7/0272 |
| | | | | 290/44 |
| 2011/0012352 | A1* | 1/2011 | Nelson | F03D 7/0272 |
| | | | | 290/44 |
| 2011/0074151 | A1* | 3/2011 | Burra | H02J 3/24 |
| | | | | 290/44 |
| 2011/0144816 | A1* | 6/2011 | Morjaria | F03D 7/0276 |
| | | | | 700/287 |
| 2011/0153099 | A1* | 6/2011 | Garcia | H02J 3/386 |
| | | | | 700/287 |
| 2012/0061963 | A1* | 3/2012 | Thisted | F03D 7/0284 |
| | | | | 290/44 |
| 2012/0104756 | A1* | 5/2012 | Beekmann | F03D 7/0224 |
| | | | | 290/44 |
| 2012/0161444 | A1* | 6/2012 | Tarnowski | F03D 7/0276 |
| | | | | 290/44 |
| 2012/0292904 | A1* | 11/2012 | Tarnowski | H02J 3/386 |
| | | | | 290/44 |
| 2012/0310426 | A1* | 12/2012 | Tarnowski | F03D 7/0272 |
| | | | | 700/287 |
| 2013/0026759 | A1* | 1/2013 | Krueger | F03D 7/0272 |
| | | | | 290/44 |
| 2013/0131879 | A1* | 5/2013 | Andresen | H02J 3/386 |
| | | | | 700/287 |
| 2015/0084338 | A1* | 3/2015 | Tarnowski | F03D 7/0276 |
| | | | | 290/44 |
| 2016/0169199 | A1* | 6/2016 | Beekmann | F03D 7/0224 |
| | | | | 290/44 |
| 2016/0285400 | A1* | 9/2016 | Yuan | H02P 9/105 |

OTHER PUBLICATIONS

Tarnowski, G. C., et al., "Variable Speed Wind Turbines Capability for Temporary Over-Production", J. Power & Energy Society General Meeting, 2009. PES '09. IEEE, pp. 1-7.

* cited by examiner

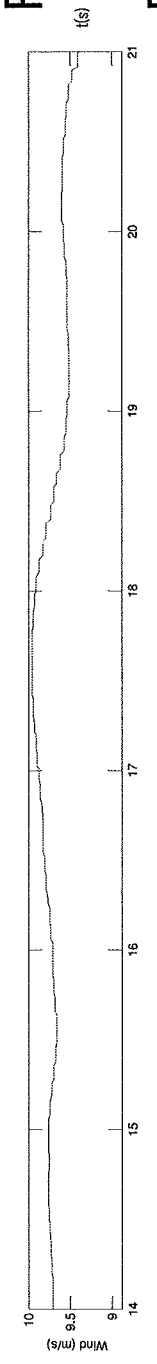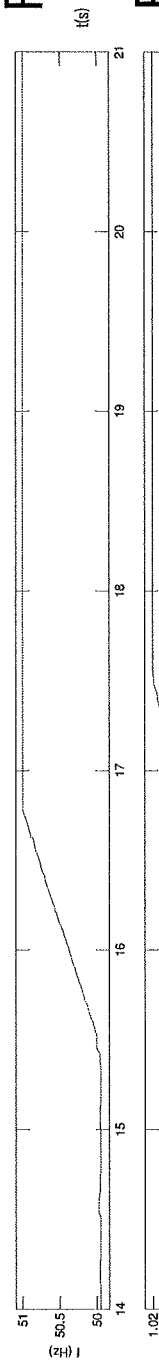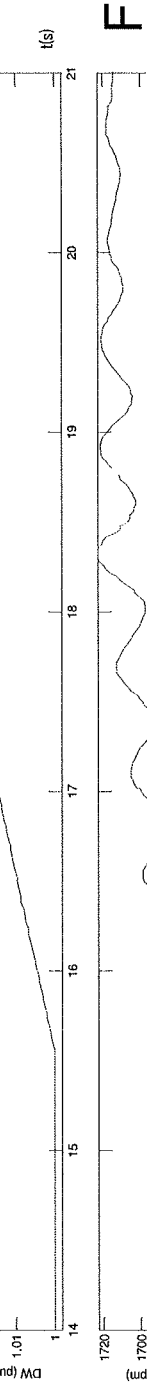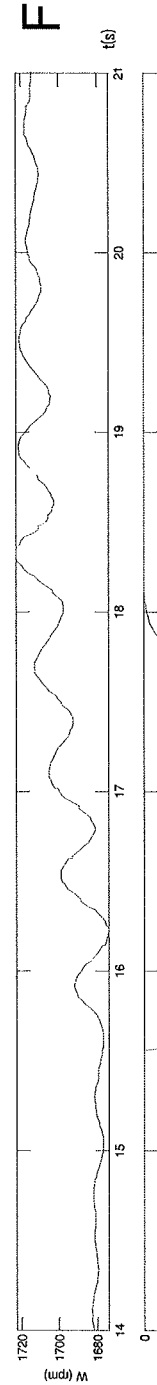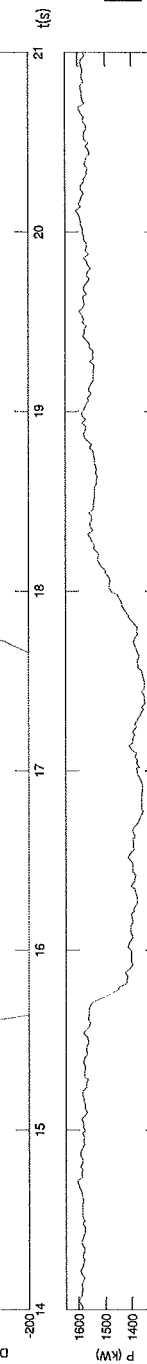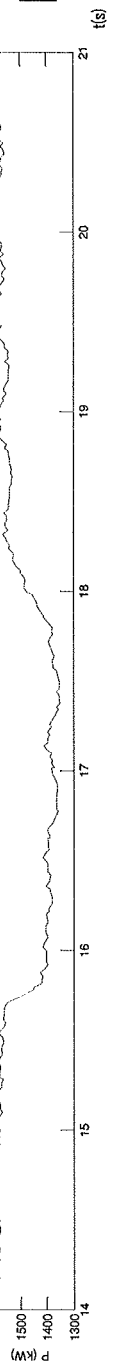

WIND TURBINE INERTIA CONTROL SYSTEM

FIELD OF THE INVENTION

The present invention concerns the control over the feed of power from wind farms into the electricity grid and, more specifically, to an inertia control system for a wind farm that comprises an inertia controller to define and communicate references to the wind turbines constituting the wind farm, and to provide the value of an inertia constant that can be configured in the wind farm wind turbines.

BACKGROUND OF THE INVENTION

Wind turbines convert the kinetic energy of the wind into electricity, which is then transmitted to a substation in the wind turbine wind farm. This wind turbine wind farm has at least one wind farm controller and at least one wind turbine comprising a rotor, which drives a generator that interacts with a power converter to generate electricity; a wind turbine controller equipped with a blade pitch angle controller and a generated power controller, a power converter controller, which interacts with the wind turbine controller; and a regulation system that coordinates the different wind turbine controllers on the basis of a series of parameters such as turbine rotation speed or grid frequency.

The nacelle on a wind turbine normally houses different components together with a transmission shaft that converts mechanical energy into electricity through a generator that interacts with a power converter. The transmission shaft in a wind turbine means the assembly between the rotor, rotor shaft, gearbox, generator shaft and generator.

The purpose of the wind turbine controller is to maximize active power generation up to a preset maximum power limit and to maintain a secure operating mode to prevent personal injuries and wind turbine damage. This wind turbine controller defines a blade pitch angle, sent to the pitch actuator to move the blades to the correct position, and an active power reference point as a reference for the converter controller located in the converter control unit.

At present, the impact of connecting wind turbines to the electricity grid is inevitable and thus grid operators are increasingly toughening wind turbine-to-grid coupling conditions. Some of these requirements are defined in terms of frequency transients that wind turbines must be capable of withstanding without uncoupling from the grid and even to react so as to help the system recover the grid frequency to its pre-established nominal values.

Transmission system operators are particularly concerned with frequency transients, normally arising when disconnecting the generator, loads or even a part of the transmission system, and consequently causing the grid frequency to change suddenly beyond its nominal values because of the difference between produced active power and consumed active power. This change in frequency requires a very rapid response to prevent the frequency from surpassing its maximum ranges and provoking a cascading disconnection of generators and electricity consumers.

Generators and grids have different response levels for correcting grid frequency in the event of a sudden drop or surge in frequency. A first and natural response for conventional generators is known as inertial response, which entails the delivery of instantaneous power because of the stored rotational energy in the shafts. A second response comes from a specific controller that increases the generation of power proportionally to the grid frequency deviation with regard to the nominal frequency, a response requiring some 15 to 60 seconds yet arresting the rising/falling frequency. However, this response, known as primary response, does not permit a return to the nominal frequency. The third and fourth responses, known as secondary or tertiary, are based on managing the generation of active power from generators, including the startup of generation units hitherto offline with a view to moving the grid frequency value to the nominal frequency value.

In this regard, insofar as the inertial response, conventional power plants using synchronous machines such as generators are rigidly connected to the grid, thus a change in frequency directly translates into a proportional change in the turbine rotational speed. The mechanical inertia of a synchronous generator thus has an essential role, since this inertia could be viewed as a conversion of a rotating mass's kinetic energy into electricity fed to the grid, whereby helping the grid reduce the frequency drop/spike.

The conversion of kinetic energy into electricity can be expressed in active power generation, i.e., rotational energy is proportional to the square of the turbine's rotational speed, which is proportional to the grid frequency. Given that power is the amount of energy per unit of time, the power delivered, due to the change in frequency, can be expressed by mathematical deduction as negatively proportional to the frequency change rate.

However, variable speed wind turbines do not have this "natural" response (inertial response) to grid frequency changes because electronic converter controllers uncouple the frequency from the generator rotational speed. Therefore, wind turbines do not naturally reduce their speed in relation to the frequency and do not deliver this energy by moving the rotor. Variable speed wind turbines do not buffer frequency drops/spikes.

Given that wind power is becoming an essential part of the electricity system, an incapacity to provide inertial response results in a reduction of the inertia in the system and, consequently, an increase in frequency drops/spikes. Accordingly, measures must be taken to prevent the wind turbines' lack of inertial response, which could entail major problems in the electricity grid caused by frequency drops/spikes.

Wind turbines with inertia control can be useful for smoothing frequency changes and, thus, for restoring the frequency of the system and preventing a drop in the load after a major drop in frequency. For wind turbines, the conceptual approach goes through increasing the active power and feeding it into the electricity grid dynamically and quickly, within a few seconds, using the inertia of the rotating blades. In this regard, various approaches have been addressed by scientific literature and patents.

The paper entitled "Frequency behavior of grid with high penetration rate of wind generation" (J. Duval, B. Meyer; 2009 IEEE Bucharest Power Tech Conference, June 28th-July 2nd, Bucharest, Romania) describes the addition of extra inertia power to the converter reference for the wind turbine controller active power. This additional active power is calculated as proportionally negative to the rate of frequency change with a parameter that defines its proportionality. Nevertheless, the power feed falls quickly thereafter. This drop in the power feed comes from two factors: wind turbine rotor deceleration, which causes a decreased active power reference of the wind turbine controller, and that the wind turbine controller controls the power according to the deviation of the turbine speed compared with a reference speed. As the wind turbine decelerates and deviates from the reference speed, the power must be reduced to recover the reference speed. In grid terms, this is known as a "recovery period" after feeding the inertia, and it entails wind turbine performance uncertainties to the wind farm insofar as frequency response and could even cause an undesired drop in frequency after the inertial response.

Patent WO2011/000531A2 and the paper entitled "Variable Speed Wind Turbines Capability for Temporary Over-Production" (Tarnowski, G. C., Kjar, P. C., Sorensen, P. E., Ostergaard, J. Power & Energy Society General Meeting, 2009. PES '09. IEEE) describe a solution similar to the aforementioned solution, differing only in that the wind turbine controller active power reference sent to the converter is fixed at a preset value for transients during a predefined period matching the expected duration of frequency transients. The additional power is then calculated as negatively proportional to the frequency change rate and proportional to the deviation of the frequency compared to the nominal frequency and added to the set power. In this case, as the controller reference is not followed, there is no drop in power because of wind turbine deceleration. Nevertheless, during the time that overproduction is fed into the grid, the wind turbine decelerates to reach the point of minimum speed, inertia delivery is stopped and the set power value released. This provokes a drastic drop in production, which remains until the wind turbine recovers its initial speed.

Patent WO2011/1124696 is also based on including additional power to the wind turbine controller's active power reference, which can be calculated both proportionally to the deviation of the frequency as well as any other manner. In this case, while the active power speed is not frozen, the wind turbine controller speed is nevertheless adapted, overcoming the issue associated with the drop in power due to wind turbine speed deceleration through the "production of a rotational speed change signal, considering an inertial rotational moment, and taking this as an output signal, which is added to the target rotational speed via a logic element". In other words, the change in speed as a result of calculating this additional power, considering the rotational inertial moment, is entered into the wind turbine controller to change the reference speed and thus prevent the drop in active power reference. However, when this extra power ends, the wind turbine should return to its normal operating mode, resulting in the ensuing "recovery period", which could cause an undesired frequency drop after this inertial response.

A conclusion could be drawn based on the state of the art that there is always a "recovery period", which depends on the performance of the wind turbine before this period commences. This "recovery period" is a challenge facing the grid because, during the delivery of the inertial response, the grid is supported and the grid frequency change is buffered; thus the wind farm is helping the system through this situation. Nevertheless, when the recovery period commences, wind farm production drops below the values before the event and, consequently, during this period of time, the wind farm could cause a grid frequency drop that must be solved by another generation plant.

DESCRIPTION OF THE INVENTION

One object of the invention is a wind turbine comprising a rotor, which drives a generator that interacts with a power converter to generate electricity; a wind turbine controller equipped with a blade pitch angle controller for at least one blade and a generated power controller, a power converter controller, which interacts with the wind turbine controller; and a regulation system that forestalls interruptions in the active power output after the addition or subtraction of power proportional to the frequency change rate by generating a power signal, negatively proportional to the frequency change rate, which is then added to the generated power controller power reference of the wind turbine controller so that the rotational speed reference of the controller is adapted according to the grid frequency An object of the invention is a method that emulates the same performance as a synchronous generator insofar as inertial response. For this purpose, the implementation of a specific controller is contemplated so as to emulate the inertial response and solve wind turbine grid uncoupling issues with electronic converters described in the state of the art.

Another object of the invention is a regulation system that precludes, as occurs in the state of the art, the wind turbine controller from increasing or reducing the power demand to reach the operation point prior to delivering extra power, which is additional to the power defined by the generated power controller in the wind turbine controller. To do so, the regulation system of the invention not only calls for power that is negatively proportional to the frequency change rate but also generates a reference speed adaptation signal for the wind turbine controller in proportion to the grid frequency with two objectives:

To ensure that the power feed matches the delivery of stored inertial energy of the wind turbine, as would be done in a conventional synchronous generator.

To ensure that the wind turbine controller does not alter the power being generated with a view to recovering the operation point before the demand for additional power and thus preclude a "recovery period".

Another object of the invention is a system that precludes this "recovery period". To do so, the system changes the rotational speed reference of the wind turbine in proportion to the frequency change through a proportional constant that corresponds to the parameter $K_{inertia}$. This proportion is related to the proportionality between the additional power and frequency change rate, and can be modified to secure a "tunable" inertia, for which the invention contemplates the definition of the parameter $K_{inertia}$ to fall within a range between 0 and 2.

Another object of the invention is that the system would consider the time delays provoking the addition of power by frequency changes and the modification of the rotational speed of the wind turbine. For this purpose, it includes delays in measuring the frequency change rate, delays in generating power by the converter controller, and even delays due to internal wind turbine rotational speed filters used in the wind turbine controller.

Another object of the invention is that the system limits the power fed into the grid through a parameter that defines the maximum additional power, both negative as well as positive, that can be fed.

Another object of the invention is a system that paralyzes both the delivery of additional power as well as the adaptation of the wind turbine rotational speed when one of the following conditions is met: When attaining a predefined value for loss of aerodynamic efficiency caused by a deviation of the wind turbine operating point in comparison with the ideal operating point. When the increase or decrease in the rotational speed of the wind turbine reaches a predefined maximum or minimum value.

Another object of the invention is that the system would recommence both the delivery of additional power as well as the adaptation of the rotational speed of the wind turbine on frequency recovery.

Another object of the invention is that the system would have an extra operating mode to prevent the freezing of inertial engagement within a predefined frequency range. For this purpose, the invention determines an element that recalculates the parameter $K_{inertia\ torque}$ and obtains the final value for $K_{inertia}$ on the basis of a frequency maximum and minimum, and a maximum increase/decrease in speed based on the aerodynamic efficiency loss calculation and some maximum and minimum speed values.

Lastly, a further object of the invention is that the wind turbine wind farm manages the inertial response through an element that controls the parameter $K_{inertia\ torque}$ at the wind farm level, adapting the value for parameter $K_{inertia\ torque}$ of each wind turbine to match a preset wind farm inertial constant value, where the inertial constant is defined as the sum of the inertial constants of all the wind turbines, which depend on the value of $K_{inertia}$ and the wind turbine rotational speed.

These and other aspects of the invention will be described in more detail with the help of the drawings shown below.

BRIEF DESCRIPTION OF THE FIGURES

FIGS. 8a-8f show the performance of the invention during a high transient frequency, reaching the maximum of 200 kW, at which the additional power is limited.

DETAILED DESCRIPTION OF THE INVENTION

Figure 1:
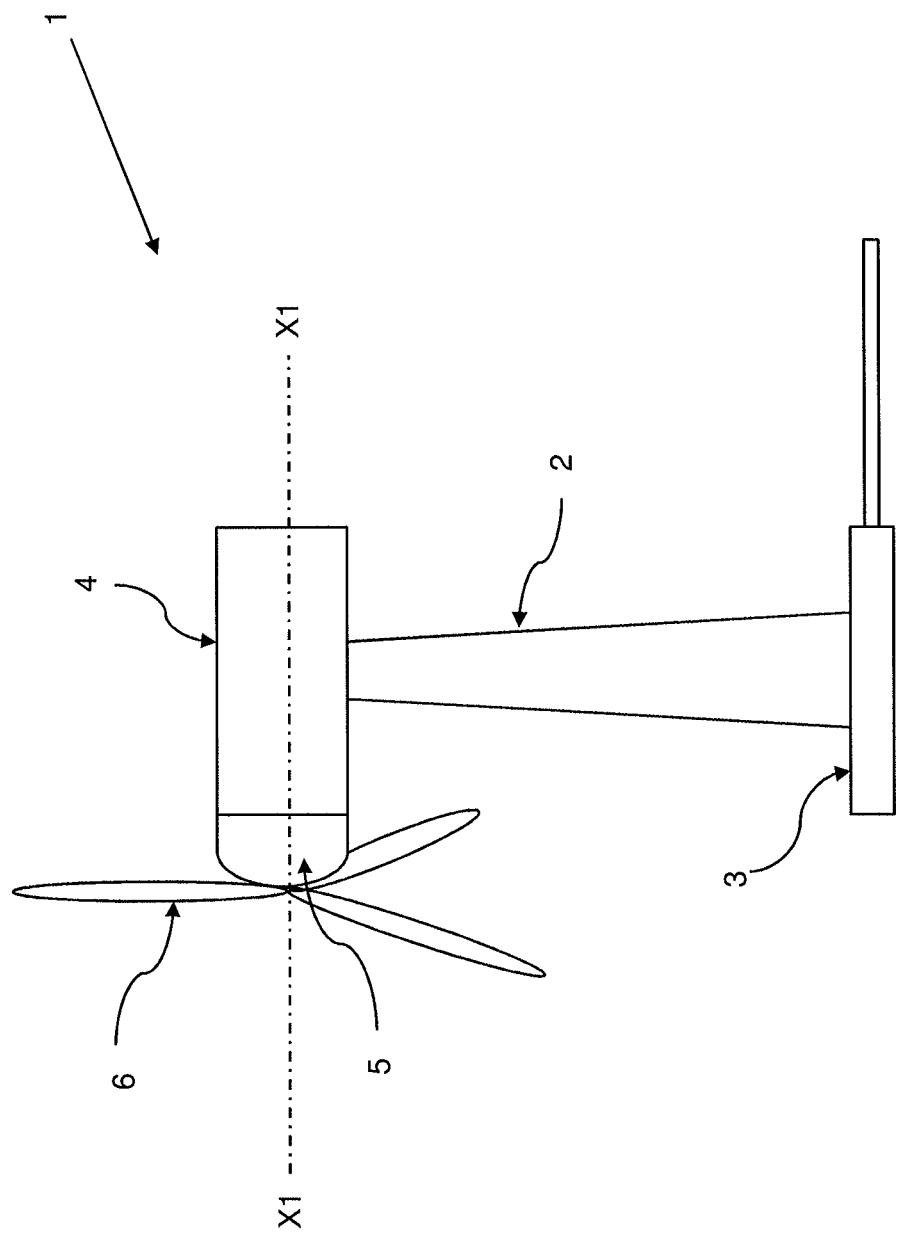
FIG. 1 provides a perspective view of a wind turbine according to an embodiment of the invention.

FIG. 1 is a side view illustrating a wind turbine (1) according to one preferential embodiment of the invention. The wind turbine (1) includes a tower (2) that stands vertically on a foundation (3), a nacelle (4) mounted on the top part of the tower (2), and a rotor (5) mounted on the front end of the nacelle (4) for rotational support with respect of a substantially horizontal axis X1-X1.

The rotor (5) has at least one blade (6), as shown in FIG. 1, mounted in a radial pattern with respect of its rotational axis. Thus, the energy from the wind when blowing against the wind turbine blades (6) from the direction of the rotational axis of the rotor (5) is converted into kinetic energy that rotates the rotor (5) on the rotational axis. The useful energy generated by the wind turbine (1) is fed through a power supply line to the substation of a wind farm.

An anemometer (not displayed in the figure) measures the wind speed in the immediate area, and an anemoscope (not displayed in the figure) measures the wind direction, for which appropriate spots are available on the edge of the outer surface (on the top, for instance) of the wind turbine nacelle (4).

Figure 2:
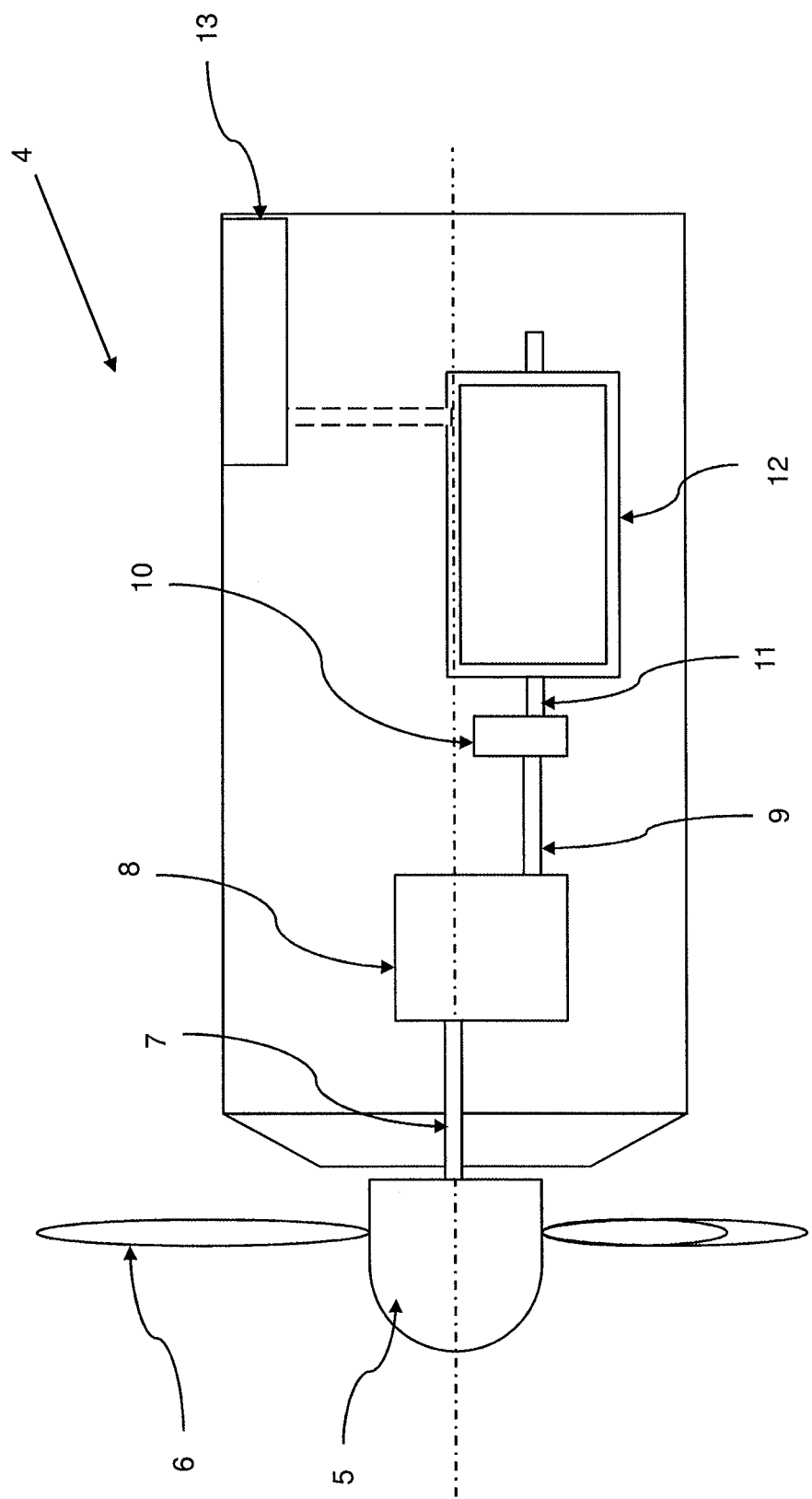
FIG. 2 shows a profile view of a nacelle in accordance with a drive train in correspondence with the embodiment in FIG. 1.

FIG. 2 displays a perspective side view of the nacelle (4) in correspondence with the embodiment shown in FIG. 1. The nacelle (4) includes various components constituting the drive train of the wind turbine (1) such as a rotor shaft (7), gearbox (8), generator shaft (9) which connect through a coupling (10) to a generator input shaft (11) and a generator (12) connected electrically to the power converter (13).

Figure 3:
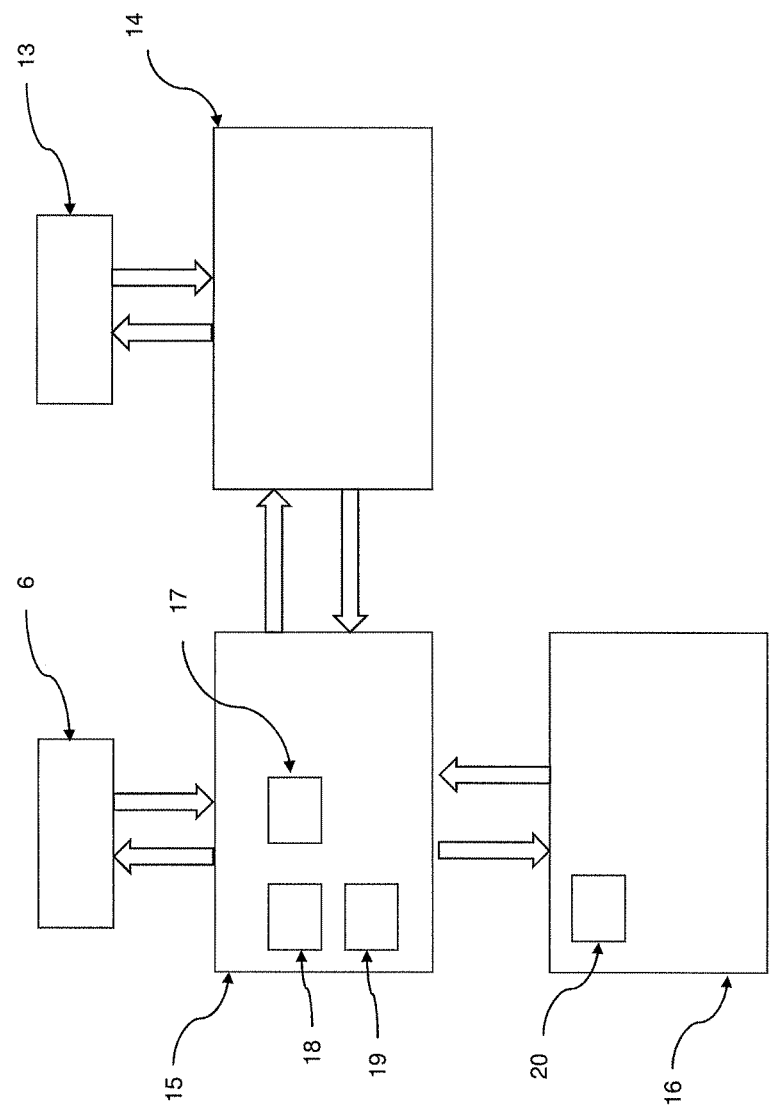
FIG. 3 shows a block diagram reflecting communications between the wind turbine controller and the converter control unit, and between the wind turbine controller and the wind farm controller according to an embodiment of the invention.

The wind turbine (1) includes a converter control unit (14) and a wind turbine controller (15). The wind farm in turn includes a wind farm controller (16). The converter control unit (14) and the wind turbine controller (15) communicate with each other in the same manner as the wind turbine controller (15) and the wind farm controller (16), as shown in FIG. 3. The wind turbine controller (15) retrieves its input from the converter control unit (14) and returns the control signals. Additionally, the wind turbine controller (15) takes measurements from different sensors and sends a control signal to the different parts of the wind turbine (1), particularly the actuator that engages the pitch angle of the blades rotating on their corresponding axis (6). The converter control unit (14) takes electrical measurements from different sensors and sends the control signal to the electrical parts of the wind turbine (1), particularly the power converter (13) that engages the generator (12).

According to one embodiment of the invention, the wind turbine controller (15) sends the power reference signal to the converter control unit (14) and also, the wind turbine controller (15) receives the rotational speed measurement of the generator (12), defined as the rotational speed of the turbine, and the measurement of the frequency from both the converter control unit (14) as well as the wind turbine wind farm controller (16). Furthermore, the frequency rate of change can be calculated in the wind turbine controller (15) or in the converter control unit (14), or even in the wind farm controller (16), and then communicated to the wind turbine controller (15). The wind turbine controller (15), in turn, comprises various elements, including the inertia emulation block (17), torque controller (18), which is the regulator that sends the power reference to the converter control unit (14), and the pitch controller (19), which is the regulator that sends the pitch reference to the pitch actuator.

Figure 4:
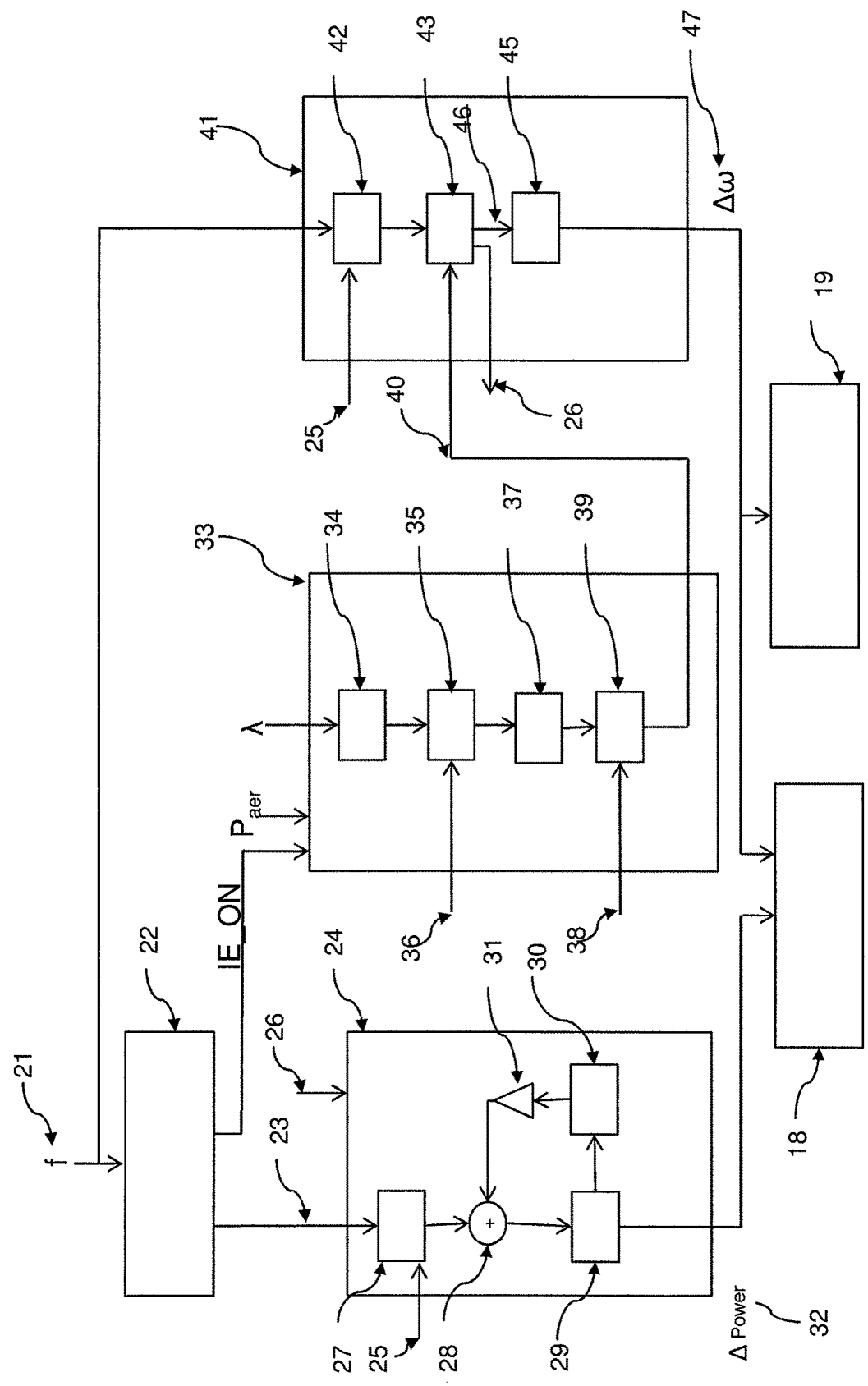
FIG. 4 shows a block diagram comprising the stages for inertia emulation in correspondence with the embodiment in FIG. 3.

FIG. 4 is a block flowchart of the inertia emulation block (17). Initially, the grid frequency (21) is computed within the inertia emulation block (17) regardless of whether it comes from the converter control unit (14) or wind farm controller (16). This computation is done within the frequency change ratio and frequency calculations block (22). This block (22) calculates the frequency change ratio or receives the values from the converter control unit (14) or the wind farm controller (16). Additionally, the frequency (21) is calculated to evaluate whether its value is outside a parameter predefined as the "frequency deadband", used to enable the inertia emulation only when the frequency (21) falls beyond the deadband. Its purpose is to keep normal frequency variations from continuously triggering inertial emulation. The output (IE_ON) from this test (22) is the emulation of the inertia that defines whether the frequency (21) is outside the frequency deadband range.

The frequency change rate value (23) of the block (22) is entered in the extra power calculation block (24), where the block (27) first calculates an extra power value as the negative value of the multiplication of the frequency change ratio (23) by the parameter $K_{inertia}$ (25), that can be defined locally or communicated by the inertia emulation element (20) in the wind farm controller (16) and by the value to the square of the turbine rotational speed, which is measured through the converter control unit (14) and communicated to the wind turbine controller (15). The calculations of the extra power calculation block (24) can be disabled by the inertia disable signal (26) when a limit is reached. Secondly, this extra power is added (28) through the output (31), which will be explained further below, and the computation of the extra power limitation block (29) that limits this value via configurable maximum and minimum values. The results of this computation are, firstly, the final value for the extra power (32) and, secondly, the difference between the limited value and the unlimited value when the extra power has been limited. This last calculation is entered into an element (30) that accumulates the input value and yields the accumulated value at (31), which multiplies, via a configurable constant, the value of the accumulation to convert it into power which is then added to the extra power in (28). The purpose of this computation is to recover the energy lost due to the extra power limitation, and to send it whenever possible, i.e., whenever no limitation has been applied.

Another block (33) calculates the maximum positive and negative variation in the turbine speed that coincides with a predefined loss of aerodynamic efficiency. The purpose for this block (33) is so that, when the wind turbine is operating below its rated power, the wind turbine controller (15) engages the power and pitch references to produce the maximum energy from the wind so as to have a correlation among the pitch angle value, turbine rotation speed and wind speed. However, when the rotational speed changes due to a frequency change, the wind turbine (1) will no longer run within its ideal operating point and the wind turbine (1) can thus undergo a loss of aerodynamic efficiency.

The input for this block (33) is "Inertia Emulation ON" (IE_ON) in order to attain calculations only when inertia emulation is not running, since calculations are invalid when it is running. Likewise, available power ($P_{aer}$) is also used as input, since wind power suffices for extracting additional power when this value is greater than its nominal power and, therefore, there is no aerodynamic efficiency loss.

The wind turbine controller (15) calculates a given value for lambda (λ), which is defined as the product of the blade radius and the rotor rotational speed divided by the wind speed value. This value lambda (λ) is entered in the block (33). The block (34) uses the value for lambda (λ) to secure blade aerodynamic efficiency following a table correlating lambda with the ideal value for its power coefficient. The validity of this table is based on the fact that the wind turbine operates with a pitch angle for a preset lambda that reaches this ideal power coefficient. Therefore, this power coefficient is computed in the block (35) together with the value of the tunable parameter for maximum aerodynamic efficiency loss (36) to yield a "degraded" value for the power coefficient Cp, in which the aerodynamic efficiency loss has been considered. This "degraded" power efficiency, Cp, is then entered into the block (37) to, via another table, yield a new "degraded" lambda value. Finally, this lambda is converted in the block (39) into rotational speed by multiplying lambda by the wind speed measurement (38) retrieved from the anemometer and conditioned by the wind turbine controller (15), and dividing by the blade radius. The difference between the rotational speed of the initial lambda and the rotational speed of the "degraded" lambda yields the change in rotational speed that will match the aerodynamic efficiency loss (40).

The block (41) adapts the speed on the basis of the frequency to coordinate the wind controller speed setpoint with the extra power delivery. Firstly, the frequency (21) is employed in the block (42) for adapting to the speed and multiplying the frequency by $K_{inertia}$ (25) and divided by the nominal frequency. The result is a factor that multiplies the wind turbine speed reference, normally within a range between 0.94 and 1.06. Secondly, this speed adaptation calculation is limited in the block (43) to a maximum value, minimum value and a change rate depending on the maximum positive and negative times.

Maximum value limitation, normally 1.06, is used to forestall uncoupling due to a maximum turbine rotational speed when operating at a nominal turbine speed.

Minimum value calculation, converted to a value per unit using the rotational speed value before activating inertia emulation, from two sources:

Change in the rotational speed that coincides with the aerodynamic efficiency loss (40)

Minimum turbine rotational speed reference.

The maximum change rate limiters on the basis of positive and negative times are calculated as a negative and positive proportion of the maximum positive and negative value limitation of the extra power employed in the block (29) divided by the turbine's inertia and speed. This value converted to a value per unit using the turbine rotational speed value before activating inertia emulation.

Firstly this block renders a signal communicating the application of a maximum or minimum limiter (26) that is sent to (24) to inform that the limitations are applied and that the delivery of extra power must therefore be disabled. Secondly, the speed adaptation (46) is sent to the next block (45). Thirdly, this inertia speed adaptation value is processed through a transfer function that represents:

Delays between applying the power reference through the torque controller (18) and generating the power reference by the converter, the controller through the converter control unit (14), and generator (12). This delay in the power entails a delay in the turbine speed change, which should be included in the speed adaptation (47).

Delays from calculating the frequency change ratio (23) due to the formulation employed in this calculation entailing a delay insofar as an ideal calculation that delays the power reference and, therefore, the generated power and ultimately the rotational speed change.

Delay due to the filters applied to the turbine rotational speed measurement in the pitch controller (19) and torque controller (18) because the reference speed change should be delayed in the same manner.

This adaptation of the turbine rotational speed (47) is used by the torque controller (18) and pitch controller (19) to adapt the turbine rotational speed reference internally.

Figure 5:
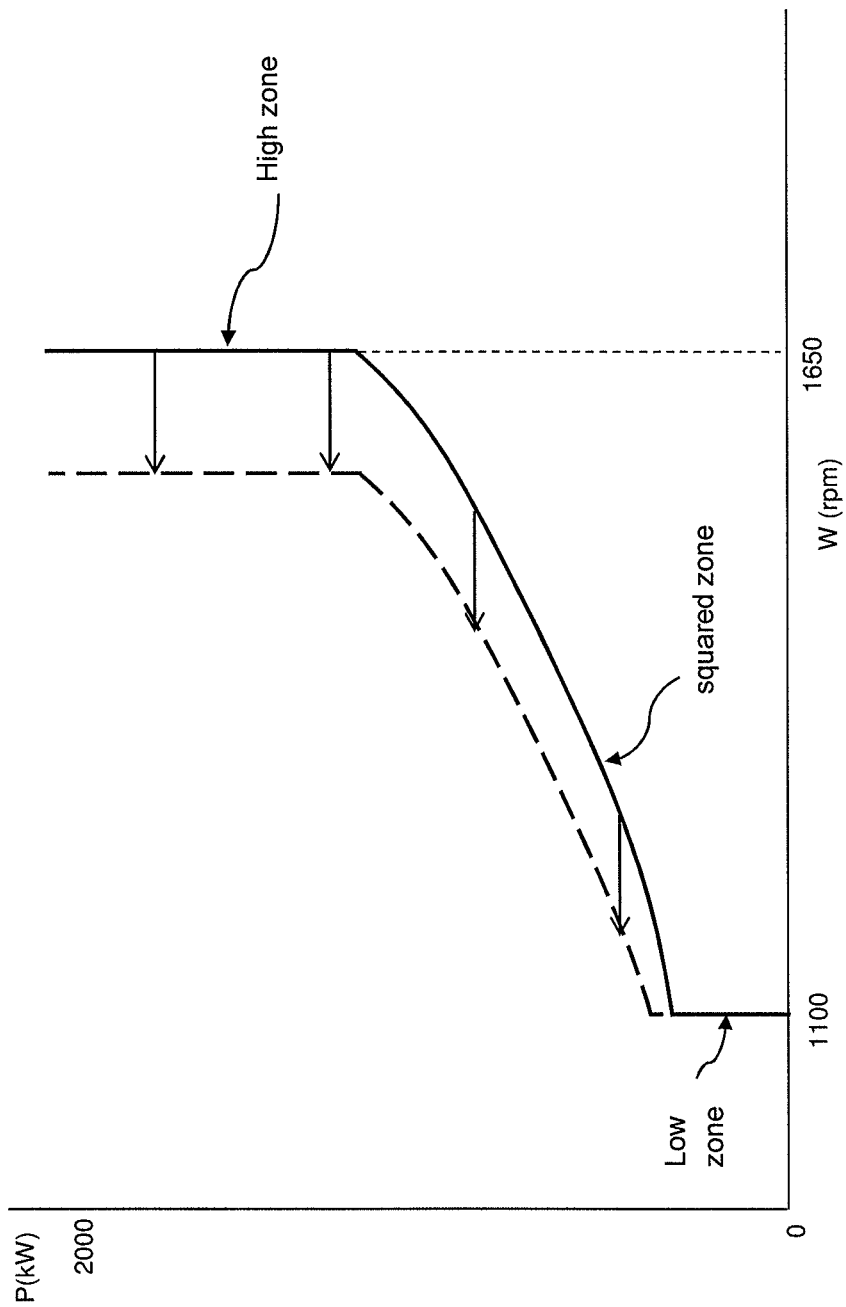
FIG. 5 shows the power-speed curve given by the torque controller and the change due to the inertia emulation.

For the pitch controller (19), the turbine rotational speed reference is generally the nominal speed so that the adaptation is applied at this nominal speed. However, the torque controller (18) generally uses a torque-speed table with different operating zones such as the ones shown in FIG. 5, firstly in the "low zone", in which the speed reference is the minimum rotational speed, secondly in the "squared" zone, in which rotational speed changes are related to the torque, and lastly in the "high zone", in which the speed reference is the nominal rotational speed. The rotational speed reference should thus be changed in these three zones in accordance with the rotational speed adaptation (47). FIG. 5 also illustrates the speed reference change, with the exception of the "low zone" case, since this is the minimum speed reference that cannot be lowered.

Figure 6:
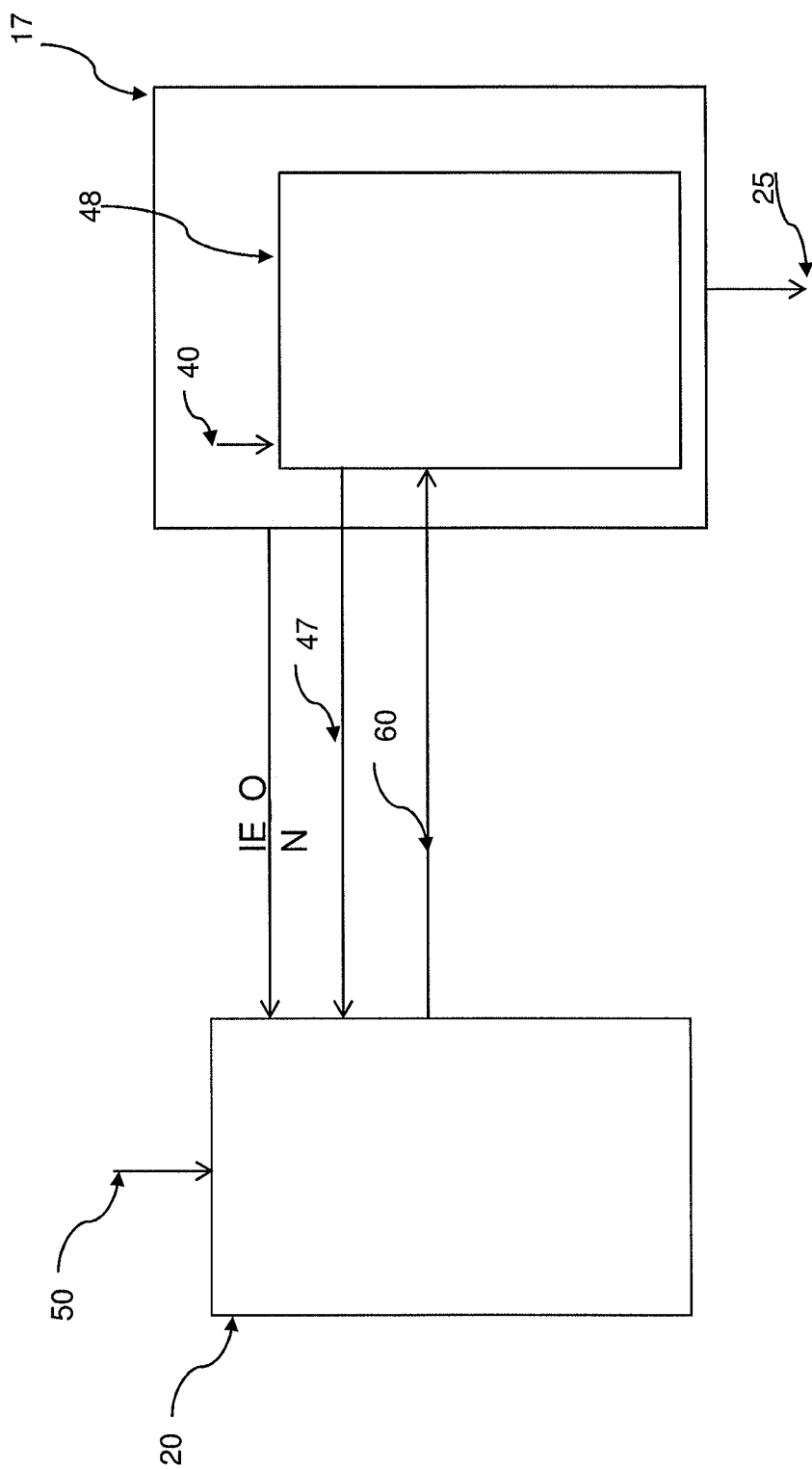
FIG. 6 shows the interaction between the wind farm controller and wind turbine controller, adding the stages of the inertia emulation block in correspondence with the embodiment in FIG. 3.

The inertia emulation block (17) contains a block (48), shown in FIG. 6, that computes $K_{inertia\ torque}$, which could either be internally defined as a parameter or sent as a signal (60) from the wind farm controller (16). Firstly, there is a special mode in which the value for $K_{inertia\ torque}$ is changed to prevent disabling inertia emulation (44) due as much to reaching aerodynamic efficiency loss as to attaining the maximum or minimum turbine speed in the block (43). This block (48) considers the preset parameters for maximum and minimum frequency and limits the final values of $K_{inertia}$ (25) for under-frequency or over-frequency using calculations that are inverted to the ones used in the element (42) linking the minimum frequency with the change in rotational speed that will coincide with the aerodynamic efficiency loss (40) frequency, and the maximum frequency with the maximum turbine speed, resulting in $K_{inertia}$ (25) for over-frequency. Secondly, this element (48) calculates the wind turbine inertia constant (47) as the wind turbine inertia multiplied by the square of the rotational speed and $K_{inertia}$ (25), divided by two.

Finally, when the wind turbine operates using the value defined by the wind farm controller (29) for $K_{inertia\ torque}$ (60), the inertia emulation element (20) within the wind farm controller (17) is employed so that the wind farm controller (17) attains a reference value for the wind farm inertia (50) defined externally, preferentially by the grid operator. When the wind farm reaches this reference value, the extra power of the entire wind farm will be negatively proportional to the frequency change rate, and the proportional constant will be the wind farm inertia constant (50) multiplied by two.

This reference value for wind farm inertia (50) is compared with the inertia value in the entire wind farm, calculated as the sum of the inertia of each wind turbine individually (47). The difference is the deviation calculated by a controller, preferentially a PI controller, to extract the value of $K_{inertia\ torque}$ (60), which is sent as a setpoint to the wind turbines. All the signals (50), (47) and (60) can be separated in under-frequency or over-frequency events. Moreover, all these calculations are done when the inertia emulation is OFF, defined when the signal (IE_ON) is zero, and are frozen while the inertia emulation is running, defined when the signal (IE_ON) is one, to preclude changes during under-frequency or over-frequency events, since calculating the wind turbine inertia (47) during events is not applicable and the constant $K_{inertia\ torque}$ (60) must be kept constant to prevent malfunctioning.

Figure 7A:
FIGS. 7a-7f show the performance of the invention in a case of low transient frequency without reaching a maximum of 200 kW, at which the additional power is limited.
Figure 7B:
Figure 7C:
Figure 7D:
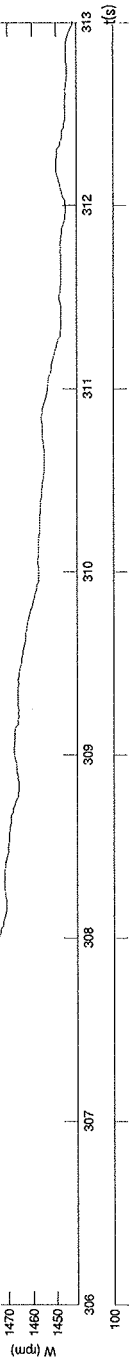
Figure 7E:
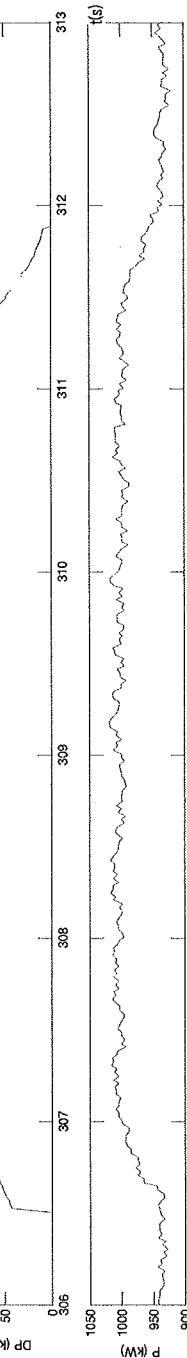
Figure 7F:
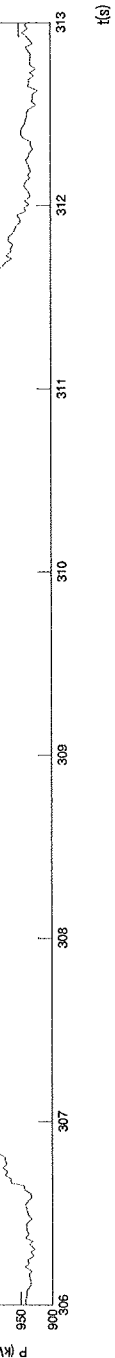

FIGS. 7a-7f illustrate the performance of the invention in low frequency of between 50 Hz and 49 Hz (FIG. 7b), variable wind (FIG. 7a) and an extra power (FIG. 7e) with the maximum (200 kW) and minimum (−200 kW) limits. Speed adaptation (46) is illustrated in FIG. 7c with the same shape as the frequency. The turbine speed in FIG. 7d follows the setpoints with a slight delay due to the element (45) and with a small oscillation from the resonance frequency of the power shaft that is quickly buffered. Power generation follows the extra power setpoint in FIG. 7e with a delay because the converter and generator (12) introduce a delay between the setpoint and generation.

FIGS. 8a-8f illustrate the performance of the invention in an over-frequency case of between 50 Hz and 51 Hz (FIG. 8b), variable wind (FIG. 8a) and additional power (FIG. 8e) limited by its minimum value of 200 kW. In this case, speed adaptation (46) did not follow the same shape as the frequency because the ramp is limited by a maximum negative ramp. The turbine speed, as illustrated in FIG. 8d, follows the speed adaptation (46) with a slight delay due to the element (45) and with a small oscillation from the resonance frequency of the drive train that is quickly buffered. Power generation follows the extra power setpoint (FIG. 8e) with a delay because the converter and generator (12) introduce a delay between the setpoint and generation.

The invention claimed is:

1. An inertia control system for wind turbines that comprise a rotor (5), a generator (12) driven by the rotor (5) that interacts with a power converter (13) to generate electricity, a wind turbine controller (15) that comprises a blade pitch controller (19) and a generated power controller (18), and a power converter controller (14) that interacts with the wind turbine controller (15), wherein said inertia control system comprises:
   an inertia emulation block (17) that generates an extra power signal (32) negatively proportional to a frequency change rate (23), the extra power signal (32) being added to the power reference of the wind turbine generated power controller (15) to adapt a rotational speed reference of the wind turbine controller (15) according to a grid frequency (21) to prevent distortion in an active power output after the addition or subtraction of power proportional to the frequency change rate (23).

2. The inertia control system for wind turbines according to claim 1, wherein the proportional relationship between the extra power signal (32) from the inertia emulation block (17) and the frequency change rate (23) is an inertial constant dependent on mechanical inertia, rotational speed of the turbine and the active power, and a parameter $K_{inertia\ torque}$ that is defined locally or via a remote controller.

3. The inertia control system for wind turbines according to claim 1, wherein an extra active power (32) is previously limited in an extra power limitation block (29) according to a configurable parameter and the unfed power, due to the limitation, is accumulated in an element (30) whose accumulated value before multiplication by a configurable constant is added to the extra active power.

4. The inertia control system for wind turbines according to claim 1, wherein a rotational speed reference of the wind turbine controller (15) is adapted (47) in proportion to a frequency change (21) divided by a nominal frequency and by a parameter $K_{inertia\ torque}$ (25).

5. The inertia control system for wind turbines according to claim 1, wherein the adaptation of a reference speed (46) of the wind turbine controller (15) is limited in the change rate (43) of the reference speed proportional to a limit of the added or subtracted active power (32).

6. The inertia control system for wind turbines according to claim 1, wherein the adaptation of a reference speed (46) of the wind turbine controller (15) is modified by a transfer function (45) that models delays between the change in the extra power signal (32) and a change in the rotational speed of the turbine, measured by sensors that communicate delays to the wind turbine control (17), as well as a delay associated with turbine rotational speed filtering within the wind turbine control (17).

7. The inertia control system for wind turbines according to claim 1, wherein the inertia emulation block (17) comprises a block (33) that calculates a maximum drop in turbine rotational speed that matches a preset aerodynamic efficiency loss.

8. The inertia control system for wind turbines according to claim 1, wherein the inertia emulation block (17) paralyzes the addition or subtraction of extra power (32) and a change in turbine rotational speed (26) when the decrease in turbine rotational speed reaches a value (40) that matches a preset aerodynamic efficiency loss (36).

9. The inertia control system for wind turbines according to claim 1, wherein the inertia emulation block (17) determines an optional operating mode that limits separate values of a parameter $K_{inertia}$ for over-frequency and under-frequency in accordance with calculated values that preclude a stopping of addition or subtraction and a change in turbine rotational speed when the turbine rotational speed increases or decreases, reaching preset maximum or minimum speed values and a predefined aerodynamic efficiency loss (40).

10. A wind farm-comprising the inertia control system for wind turbines of claim 1, wherein the wind farm generates an extra power signal (32) negatively proportional to the frequency change rate (23) to prevent distortion in the active power output after the addition or subtraction of power proportional to the frequency change rate, wherein said frequency change rate is added to the generated power controller (18) power reference of the wind turbine controller (15), and wherein the rotational speed reference of the controller is adapted according to the grid frequency (21).

11. The wind farm according to claim 10, wherein a wind farm controller (16) comprises an inertia emulation element (20) that dynamically adapts wind turbine references to a parameter $K_{inertia\ torque}$ (60) so that the wind farm generates extra power negatively proportional to the frequency change rate, and the proportional constant is a wind farm inertia constant (50) multiplied by two.

12. The inertia control system for wind turbines according to claim 1, wherein the inertia emulation block (17) paralyzes the addition or subtraction of extra power (32) and a change in turbine rotational speed (26) when the decrease or increase reaches some predefined maximum or minimum speed values.

* * * * *